United States Patent
Alpert et al.

(10) Patent No.: US 12,401,428 B2
(45) Date of Patent: Aug. 26, 2025

(54) FAIL-SAFE OPTICAL WIRELESS POWER SUPPLY

(71) Applicant: Wi-Charge Ltd., Rehovot (IL)

(72) Inventors: Ortal Alpert, Ness Ziona (IL); Lior Golan, Ramat Gan (IL); Ori Refael Mor, Tel Aviv (IL); Ran Sagi, Tel Aviv (IL); Omer Nahmias, Aminadav (IL); Yoram Ashush, Petach Tikveh (IL); Yoav Biderman, Tel Aviv (IL); Zohar Mills-Levin, Rehovot (IL); Yan Rosh, Rehovot (IL); Eyal Conforti, Tel Aviv (IL)

(73) Assignee: Wi-Charge Ltd., Rehovot (IL)

(*) Notice: Subject to any disclaimer, the term of this patent is extended or adjusted under 35 U.S.C. 154(b) by 0 days.

(21) Appl. No.: 18/352,061

(22) Filed: Jul. 13, 2023

(65) Prior Publication Data
US 2023/0361885 A1 Nov. 9, 2023

Related U.S. Application Data

(63) Continuation of application No. 17/378,218, filed on Jul. 16, 2021, now Pat. No. 11,722,226, which is a
(Continued)

(51) Int. Cl.
*H04B 10/80* (2013.01)
*H02J 7/02* (2016.01)
*H02J 50/30* (2016.01)

(52) U.S. Cl.
CPC .......... *H04B 10/807* (2013.01); *H02J 7/02* (2013.01); *H02J 50/30* (2016.02)

(58) Field of Classification Search
CPC ...... H04B 10/807; H04B 10/60; H04B 10/50; H04B 10/564; H04B 10/032;
(Continued)

(56) References Cited

U.S. PATENT DOCUMENTS 5,771,114 A 6/1998 Andersson et al.
7,068,991 B2 6/2006 Parise
(Continued)

OTHER PUBLICATIONS

International Search Report and Written Opinion of International Application No. PCT/IL2018/051073, Dated Jan. 4, 2019, 18 pages.
(Continued)

*Primary Examiner* — Hibret A Woldekidan
(74) *Attorney, Agent, or Firm* — Maine Cernota & Curran

(57) ABSTRACT

A fail-safe wireless power transmission system having a transmitter, a receiver, a receiver functionality monitor unit, a transmitter functionality monitor unit and at least two sensors. The transmitter has at least one low emission state, and at least one high emission state, the high emission states having higher emissions and more complex safety systems. The transmitter may be precluded from switching from a low emission state to any high emission states upon detection of a receiver control unit malfunction, a transmitter control unit malfunction, a likelihood of human-accessible emission from the system greater than a predetermined level, or an inconsistency between results arising from at least two of the sensors. Two different methods of such preclusion may be used simultaneously or consecutively to improve reliability. A transmitter control unit analyzes data from the sensors, and performs calculations to determine if and what type of preclusion is needed.

9 Claims, 7 Drawing Sheets

Related U.S. Application Data continuation of application No. 16/651,788, filed as application No. PCT/IL2018/051073 on Sep. 28, 2018, now Pat. No. 11,070,298.

(60) Provisional application No. 62/564,428, filed on Sep. 28, 2017.

(58) Field of Classification Search
CPC .. H04B 10/5055; H04B 10/503; H04B 10/40; H04B 10/07955; H04B 10/0799; H02J 50/30; H02J 7/02; H04Q 2213/1301; H04Q 2011/0043; H01S 5/06825; G02B 6/4286

See application file for complete search history.

(56) References Cited

U.S. PATENT DOCUMENTS

| | | | | |
|---|---|---|---|---|
| 7,433,595 | B2* | 10/2008 | Sakai | H04B 10/00 398/13 |
| 8,897,636 | B2* | 11/2014 | Yoon | H04B 10/272 398/141 |
| 9,312,701 | B1* | 4/2016 | Mor | H02J 50/30 |
| 11,070,298 | B2 | 7/2021 | Alpert | |
| 2002/0027690 | A1* | 3/2002 | Bartur | H04L 7/0338 398/139 |
| 2010/0079011 | A1 | 4/2010 | Hyde et al. | |
| 2012/0039610 | A1* | 2/2012 | Bradbury | G02B 6/4457 398/116 |
| 2012/0087663 | A1* | 4/2012 | Hattori | H04B 10/272 398/66 |
| 2014/0132647 | A1* | 5/2014 | Yamashita | G09G 3/3208 345/691 |
| 2014/0219654 | A1* | 8/2014 | Mitsui | H04B 10/032 398/45 |
| 2015/0255994 | A1* | 9/2015 | Kesler | B60L 53/124 307/10.1 |
| 2016/0013656 | A1 | 1/2016 | Bell et al. | |
| 2017/0019180 | A1 | 1/2017 | Lucrecio et al. | |
| 2017/0093228 | A1* | 3/2017 | Fisher | H02J 7/35 |

OTHER PUBLICATIONS

International Preliminary Report on Patentability of International Application No. PCT/IL2018/051073,2020, 15 pages.

Office Action for U.S. Appl. No. 16/651,788, dated Sep. 3, 2020, 13 Pages.

Notice of Allowance for U.S. Appl. No. 16/651,788, dated Mar. 16, 2021, 20 Pages.

Extended European Search Report for Patent Application No. 18863738.3 dated May 26, 2021, 7 pages.

Office Action for U.S. Appl. No. 17/378,218, mail date Jun. 24, 2022, 30 pages.

Notice of Allowance for U.S. Appl. No. 17/378,218 mail date Mar. 17, 2023, 11 pages.

* cited by examiner

FAIL-SAFE OPTICAL WIRELESS POWER SUPPLY

RELATED APPLICATIONS

This application is a continuation of U.S. application Ser. No. 17/378,218, filed Jul. 16, 2021, which is a continuation of U.S. application Ser. No. 16/651,788, filed Mar. 27, 2020, which is a national phase application filed under 35 USC § 371 of PCT Application No. PCT/IL2018/051073 with an International filing date of Sep. 28, 2018, which claims the benefit of U.S. Provisional Patent Application 62/564,428 filed Sep. 28, 2017. Each of these applications is herein incorporated by reference, in its entirety, for all purposes.

FIELD OF THE INVENTION

The present invention relates to the field of wireless laser power systems, especially those having safety systems.

BACKGROUND

There exist systems for transmitting wireless power to charge portable electronic devices. Since these systems potentially expose users to various fields (i.e. RF, laser, magnetic, electric or Ultrasound), they require some kind of safety system, designed to prevent user exposure to such fields.

Human exposure to such fields is regulated by various standards, regulations and laws such as:

US Code of Federal regulations, title 21, volume 8, Chapter I, Subchapter J part 1040;
ANSI Z136.1;
IEC60825 series of standards; and
the International committee for non-ionizing radiation recommendations and publications.

The levels of radiation considered safe for public exposure, as found in these publications, which represent the knowledgeable opinion of world renowned experts, are insufficient to allow delivery of the several watts of electrical power that are needed for most uses. For example, such safe levels are not high enough to power most portable electronic devices, and therefore, to provide adequate power, measures must be taken to avoid exposure of humans, animals and objects to the beam. For example, if a cellphone having a 10 Wh battery is to be charged over two hours, from an empty to fully charged state, then at least 5 watts of electrical power need to be transferred into the battery. Consequently, at least 5 W of power need to be carried from the transmitter to the receiver, typically by an energy beam from the transmitter to the receiver. The amount of energy that needs to be transferred from the transmitter to the receiver is higher, since conversion efficiencies are typically much less than 100%.

Such power levels are substantially beyond the levels allowed by the various standards, regulations and laws, unless a reliable safety system is incorporated to ensure that even such levels of power cannot cause harm to persons or other things liable to be harmed by the beam. For example:

In the US, Code of Federal Regulations (CFR), title 21, volume 8, Chapter I, Subchapter J part 1040 (revised on April 2014) deals with performance standards for light emitting products-laser products.

For non-visible wavelengths there exist, class I, class III-b and class IV lasers (class II, IIa, and IIIa are for lasers between 400 nm and 710 nm, e.g. visible lasers).

Of the non-visible wavelengths, class I is considered safe for general public use and classes IIIb and IV are considered unsafe.

The MPE (Maximal Permissible Exposure Value) for class I lasers, according to the US, CFR 21, volume 8, Chapter I, Subchapter J part 1040, for 0.1-60 seconds of exposure are shown in the graph of FIG. 1, which shows that:

1. The Maximum Permissible Exposure Levels generally increase with wavelength and decrease with time duration of exposure.
2. Even if a laser is turned off 0.1 second after a person is exposed to the beam, in order to meet the requirement specified in US-CFR 21, ~1040, no more than 1.25 W of light can be transmitted at wavelengths of greater than 2.5 µm, and much less at shorter wavelengths. Without a mandated reliable safety system, only a few milliwatts of laser power are allowed, which when converted back to electricity, would supply significantly less power than the power needed to charge most portable electronic devices (e.g. a cellular phone requires between 1 and 15 W for full charging). It is well known in the art that fingerprints and dust scatter laser light, and that transparent surfaces can reflect or scatter it. If high power is to be transferred, such as for a typical phone charged using 1-12 W of electrical power, then, taking into account some conversion inefficiency from laser to electrical power (whose efficiency is typically less than 50%), a laser power of 2-24 W would be needed.

Therefore, to charge such a typical phone, a laser having power corresponding to a class IV laser would be needed. For Class IV lasers, even scattered radiation from the main beam is considered dangerous. According to the US, CFR 21, volume 8, Chapter I, Subchapter J part 1040, lasers between 400 nm and 1400 nm above 0.5 W for exposure above 0.5 seconds are usually considered class IV lasers, and even scattered radiation from such lasers may be dangerous, with the exception of scattering from absorbing elements designed specifically for ensuring laser safety. Such lasers are required to have many safety features, and require preventive warning and limiting features, such as a key lock, warning labels, and the user of the laser is usually required to wear safety goggles and undergo proper training. Reference is now made to FIG. 2, showing an exemplary warning label.

On the other hand, if such a high-power laser is equipped with a safety system that does not allow humans access to the high power, it may be classified as a class I laser, even if the power is high. For instance, if a high-power laser would be enclosed in a protective housing that does not allow access to the laser beam, it may be considered a class I laser product and may be suitable for public use. For example, office laser printers are typically a class I laser product, although they have an embedded high power laser. The laser beam cannot be accessed as it is sealed in a non-accessible enclosure.

Therefore, without a flexible, comprehensive and robust safety system, class IIIb or class IV lasers cannot be suitable for public use. There is general agreement that a safety system is needed to allow transfer of power using a laser in an everyday environment. At the date of filing of this application, no such system appears to have been commercialized. A system designed for public use is different from a system designed to be operated by a trained professional, in that it cannot rely on the trained professional to identify and respond to a problem. In order to allow the public to use high power lasers, a safety system must be in place which should reliably prevent exposure of people, animals, and objects to potentially hazardous levels of radiation.

There exist in the prior art many such safety systems designed to prevent exposure of users to unsafe radiation levels. However, prior art systems do not have systems or methods in place for ensuring the reliability or functionality of the safety system itself. Thus, the prior art systems do not appear to assure reliable and fail-safe work even under sub-optimal conditions. Prior art systems do not appear to be equipped with a subsystem for verifying that the safety system indeed works as expected. Furthermore, prior art systems are not equipped to identify damage to, or malfunction of, certain components in the safety system and to respond appropriately to such. Finally, prior art systems do not take into account various changing environmental and internal factors or situations that may present a potential hazard, either individually or combined.

There may be various safety systems that allow a quick enough response time to allow a high power beam to be turned off before the MPE is exceeded, or that do not allow humans, animals and objects to access the beam. Some prior art systems include safety and hazard detection systems geared towards detecting a possible object or person in the beam, and when such an object is detected, quickly turn the beam off or attenuate the beam. Typically, such safety systems are even arranged to provide a margin from potentially hazardous situations.

Prior art systems have been described which include safety systems designed to prevent exposure of users to unsafe radiation levels. A few examples include:

In US20100320362 A1, for "Wireless Laser Power Transmitter" having a common inventor with the present application, a system is described which waits for a confirmation safety signal from the receiver before transmitting power to it, the safety signal indicates that safety conditions are indeed met (for example, that the laser has been received by the receiver, indicating that no object is placed between the transmitter and receiver).

In some prior art references, such as US20070019693 or US 20100320362 A1, safety systems compare the level of radiation that could potentially be emitted from the system at a given configuration, to the accessible emission limits set by safety standards, sometimes even with a safety margin, and when such a threshold is exceeded, terminate the beam emission.

Some prior art systems use complex systems to guarantee safety, such as US20070019693A1 for example, using software and computer hardware to perform complex calculations to determine whether it is safe to operate the beam or not. However, the more complex the system, the more it becomes prone to faults, malfunctions glitches and bugs.

As the hardware and software becomes more complex, selection of reliable components becomes increasingly harder, and verification of complex algorithms and software also becomes problematic. Receiving safety confirmation signals ("OK signals") from the receiver (and keeping safety margins cannot guarantee safe operation in power beaming applications between transmitters and receivers from different manufacturers, which may interact unpredictably).

Prior art safety systems are often focused on "detecting objects in the beam" and are unable to take into account a plethora of natural variances, factors and problems that may exist either in the system or in the surrounding environment. For example, in the above mentioned US20100320362 A1 the transmitter waits for a confirmation signal from the receiver, indicating that the laser beam was successfully received by the receiver, before turning the beam on continuously. If the beam is blocked, the receiver turns the confirmation signal off and the beam turns off. Such a system is able to detect concrete potential hazards, for example, if the beam does not reach the receiver.

Prior art systems, such as US20070019693A1, use a CPU and a camera and an image processing program, which are complex systems, but no indication is provided that these systems are able to respond to bugs and malfunctions.

While some prior art suggests the use of controllers, such as in US20100320362, for example, where in steps 139, 140 of FIG. 10, the controller decides to "continue to turn on the gain medium using continuous pump power", should the controller fail or malfunction at that point, the laser would stay on and the system would ignore the safety features that are usually performed by the controller.

Some prior art systems switch to a low emission state, which is typically the OFF state, usually, by turning the power to the laser off, or by sending a code to the laser driver instructing it to lower the power. Some prior art systems change to a low emission state upon indication of a potential hazard from a sensor, typically one indicating an object in the beam's path. However, this single faceted method of switching to a low state is often unreliable and is not resilient to faults, such as those occurring in the switch itself.

Other prior art systems which may be of relevance to the issue of safety include:

U.S. Pat. Nos. 5,260,639, 6,407,535, WO1998/013909, U.S. Pat. Nos. 6,633,026, 8,748,788, US2007/0019693, US2010/0320362, US2007/0019693, US2010/0012819, US2010/0194207, U.S. Pat. Nos. 6,407,535, 6,534,705, 6,633,026, US2006/0266917, U.S. Pat. Nos. 6,967,462, 6,534,705, 8,399,824, 8,532,497, 8,600,241, 5,771,114, 6,222,954, 8,022,346, 8,399,824, and 8,532,497.

There is therefore a need for a new system that assures reliable, fail-safe operation to a level that would allow the safe operation of a system in places accessible to the public and without the supervision of a professional operator.

The disclosures of each of the publications mentioned in this section and in other sections of the specification, are hereby incorporated by reference, each in its entirety.

SUMMARY

The presently disclosed systems differ from prior art systems in that they provide a reliable, fail-safe, power transmission system that includes a safety system utilizing complex electronic subcomponents. These systems are resilient both to various malfunctions in the system, and also to various "faults" or potential hazard factors that may happen in a public environment. Such systems reduce potential hazards to users, animals and property more completely than conventional prior art safety systems, and generally guarantee that emission levels do not exceed a safe threshold, both under normal operation, and in fault conditions. Such a guarantee is enabled in an automatic manner without reliance on professional intervention or supervision.

Three guiding principles differentiate the presently disclosed systems from the existing prior art systems:
  1. The presently disclosed systems are self-diagnosing, and detect and safely respond to types of errors, problems, malfunctions, faults, glitches, and biases, which are generally unhandled by prior art systems. For example, an exemplary presently disclosed system can detect or predict a malfunction in one of its components, and can detect a component whose value or function is changing from its nominal value or function, and automatically responds to these faults in a way that maintains safe system operation.
2. The presently disclosed systems are built to be able to safely recover from such errors, problems, malfunctions, faults, glitches and biases.
3. The presently disclosed systems, in addition to detecting objects in the beam's vicinity, can also estimate the likelihood of human access to radiation, also referred to as human-accessible emissions, exceeding safe limits. The term potentially hazardous human-accessible emission is used throughout this disclosure to describe human-accessible emissions that exceed safe limits. The presently disclosed systems take into account the fact that real life problems or variations, such as losses, misconfigurations, dirt, component malfunctions, noise, biases, and ageing of components, are inevitable in a real life system. For example, reflections from surfaces provide continuous "leaks" from the system that should be monitored and tracked. Furthermore, the presently disclosed systems are able to estimate a combined risk of multiple inherent or environmental factors, using multiple measurements, data points, or calculation results. Thus, even when a single sensor or factor does not indicate a high risk, the system is able to determine if the combined risk indicated by two or more sensors or factors does necessitate taking action to ensure safety. The risk may be determined based on departure from an expected normal range of data from one or more sensors. The current safety system is thus built using the concept of estimating the likelihood of potentially hazardous human-accessible emission, typically using multiple data points and sophisticated algorithms.

An exemplary implementation of the current system is a wireless power transmission system typically having at least one transmitter and at least one receiver. The system may also include external control units, and further transmitters, and power relays, and many of the functions for fail-safe operation may be allocated in different ways between the transmitter, receiver(s) and external modules.

The transmitter has a beam generator for emitting a beam, and typically, a beam deflection unit for deflecting the beam in the direction of the receiver(s).

The transmitter also typically includes a controller, or transmitter control unit, and at least one sensor.

The receiver may also include a controller, or receiver control unit, and at least one receiver sensor, which may be used to provide information regarding the safe operation of the system. In some implementations, a receiver sensor may be partially implemented outside the receiver, for example, if a reflector is incorporated in the receiver, the transmitter may be able to measure some of the receiver data remotely.

The receiver also typically comprises a power converting element, such as a photovoltaic cell, with or without a voltage converting circuit or a circuit to enable the tracking and following of the maximum power point.

The presently disclosed systems use at least two sensors, which may be located in the receiver, in the transmitter, or elsewhere in the system, for determining the assessment of the potential for human-accessible radiation exceeding a threshold. The term sensor, as used throughout this disclosure, describes at least one, but in many cases a plurality of components, generating data which is relevant for determining the assessment of the potential for human-accessible radiation, as well as the algorithms and components used to process the data, yielding an output which is indicative of a potential for human-accessible radiation exceeding a threshold. Examples of sensors may be a tracking sensor; a position sensor; a timer; a time clock; a direction sensor; a receiver orientation sensor; a temperature sensor; a transmitter emitted power sensor; a receiver received power sensor; a communication link; a wavelength sensor; a transmitter shock sensor; a receiver shock sensor; a beam shape sensor; a set of data associated with time and place stored in computer memory; a humidity sensor; a gas sensor; a range sensor; an optical sensor; a watchdog circuit; and an indication from a control center over a communication means. Sometimes there may be two sensors for measuring the same parameter, or the sensors may measure different comparable parameters. For example, the current fed into a laser diode may be compared to the control word for the laser driver and to the optical power emitted from the laser diode. In this example, all three of these values should provide essentially corresponding values. Sometimes a mathematical formula may be used to input data from different sensors and to provide comparable results. For example, the current times the voltage in the receiver, divided by a temperature-dependent efficiency, may be compared to the power emitted from the laser. The system may have one or more emission-state sensors to determine if the system is in a high emission state or in a low emission state, these states being now defined. The transmitter can be in at least two states, one of which is a low emission state, and the other one or more states being high emission states.

A low emission state is a term used throughout this disclosure to describe a state of the system known to have human-accessible emissions below a threshold, this threshold typically being below that defined by at least one known safety standard. The term standard is used herein in its broad meaning, including, inter alia, safety related publications, regulations, standards, recommendations, and laws. A low emission state typically should not rely heavily on complex and possibly error/fault/glitch/malfunction/bug prone components to achieve its safety or low human-accessible emissions. There are many different ways to cause the system to be safe by having low accessible emissions, with a high probability of the human-accessible emissions being below a threshold. The simplest example of a low emission state, or safe state, is when the laser turned off, but other exemplary implementations of this disclosure include low power laser operation, a fast scanning beam, so the beam is not in the same place for a long time, the laser aimed at a "beam block", the laser being blocked, for example by a shutter, a diffuser being added into the beam, and the beam being split into multiple beams.

A high emission state is a term used throughout this disclosure and is used to describe a state of the system having emissions higher than the highest emissions permissible in the low emission states. Typically, a high emission state has human-accessible emissions below some safety threshold, although the overall emissions from the transmitter are higher than that of the low emission states. These high emissions are usually protected by a safety system. The high emission state is typically used to transmit higher energy to the receiver than that of a low emission state. An example of a typical high emission state is a state having beams from the transmitter, some of such beams being aimed at a receiver, and such beams being nearly completely absorbed by the receiver. A safety system attempts to ensure that no object is found in any beam and that no emissions are above safe limits, so that the human-accessible emissions from the system are low although the emissions are high. However, such safety systems usually use complex means to operate, and are typically built around a CPU or a controller or an ASIC system, described here as a complex electronic system.

A complex electronic subsystem is term used throughout this disclosure to describe a subsystem comprising large number of electronic components, typically at least hundreds of thousands of components, and typically also executing a code or a script. Examples of such complex electronic subsystems are processors, controllers, ASICs, and embedded computers. Such systems have very large number of possible states, making it nearly impossible to test every possible state in the product. For example, a processor may have 108 transistors or more, such that a passing gamma particle, for example, may cause one of said transmitter to emit a random signal. The processor may be in a very large number of states when such a random signal is generated and the result may be unpredictable and extremely difficult to test, or even to simulate, such as is described in the article by D. Aslam et. Al, Physical Science International Journal, 4(7): 962-972, 2014

In order to avoid confusion, the word fault, as used in this disclosure, is meant to include temporary faults, also known as glitches, that are known to happen in complex systems, as well as permanent faults, as is the common interpretation of the term.

For example, some controllers, such as the TMS320LF24xx provided by Texas Instruments, have very long MTBF (Mean Time Between Failures). MTBF is tested by testing the component lifetime, usually performing tests to accelerate the time elapsed until a component permanently fails. Typically, such tests do not take into account temporary faults which may result from local overheating or noise in a conductor. As another example, consider a cellular telephone system. The meaning of fault as used in the term MTBF would include events that render the phone useless, such as the phone catching fire, while the word fault as used herein includes also a call being disconnected, or a software fault causing the system to "hang" which are temporary faults, which last a very short while. Moreover, such a component may fail as a result of another component failure, such as a cooling fan or a power supply, or as a result of increased environmental temperature.

In the article by Edmund B Nightingale, John (JD) Douceur, Vince Orgovan, in Proceedings of EuroSys. 2011, ACM, Apr. 1, 2011, the failure rate was measured for CPUs, accumulating 5 days of total accumulated CPU time, and was found it to be ~0.3%, the probability of a second failure being even higher.

On top of the failures measured in the above paper, such systems are also prone to other errors such as software bugs, memory leaks, memory failures, software and hardware glitches and other various problems.

The presently disclosed systems, because of the multiplicity and interaction of the elements contributing to its safety level, are more resilient to problems caused by, inter alia, such failures, bugs, memory leaks, passing gamma particles, and noise as compared with the prior art.

The systems of the present disclosure also typically have at least one functionality monitor system. There may be a transmitter functionality monitor unit associated with the transmitter, and a receiver functionality monitor unit associated with the receiver. A functionality monitor system is a term used throughout this disclosure to describe a system which monitors a complex electronic subsystem. Some functionality monitor systems may operate by a countdown to reset system, in which the controller must reset the countdown before it ends, indicating that it is in good operational condition. When the countdown ends, the functionality monitor may send a reboot signal to the controller. Other functionality monitor systems relay on other signals, such as thermal emissions or statistical analysis, to determine the "health" of the complex component. In some cases, single functionality monitors are used to create a more robust functionality monitor system.

Functionality monitor systems can be implemented, for example, by countdown timers that need to be repeatedly resettled after short time intervals, or by a "good health" signal output from the complex component, which is often a result of an internal safety check. In some cases, the verification of "good working order" may take the form of a "conversation" between two components. For example, the functionality monitor may request the complex component to perform a task, and verify the output against a known output, or by measuring the performance signature of the controller, such as temperature(s), RF emissions, voltage, or other signatures indicating operational conditions, or by calculating statistics of outputs from the components and comparing it to "health signature". A basic example is "checking that the output signals are not constant, but that they are responding to input signals".

The functionality monitor may check a complex component, such as a controller in the transmitter or receiver. Such checking may be periodic, such as based on a timer performing periodic checks, for example checking every second. Alternatively, such checking may be performed before or after a specific operation, examples of such being every time the laser goes above a specified number of watts, or before using a complex component to perform a safety function. The check may be triggered based on an external signal, such as a timer, button press, specific mirror position, or at the end of the last check (e.g. continuously), by an external trigger, or at random intervals.

On each operation, the functionality monitor typically checks at least part of:
1. The existence of OK signal(s) from the controller(s) or complex component(s),
2. the existence of any signal from the CPU/controller/complex component,
3. a signature (e.g. correct current, voltage, temperature, or different combinations and relations of such parameters, etc., . . . ),
4. a valid response from the CPU/controller (e.g. ping), or
5. statistical fingerprinting of the output of the controller/CPU/complex component.

Other checks may also be envisaged.

A functionality monitor is typically characterized by its ability to detect the complex component's malfunctions. Typically, such functionality monitors are configured to have a high probability of detecting a malfunction, even at the cost of a small risk of false positives.

Upon indication from the functionality monitor system(s) of a likelihood of a fault, glitch, or malfunction in a complex component operation, the functionality monitor precludes the system from switching to any relevant high emission states. This is because, typically, high emission states rely more on complex safety systems and on complex components, or on the specific complex component, as the controller usually performs many safety related operations in these high emission states. Due to its complexity, a high emission state is likely to be adversely affected by a fault, creating potential hazards to people, animals, or property. Therefore, it is safer for the system to maintain a low emission state in such a situation, both because a low emission state has human-accessible emissions below a threshold, and because in maintaining such low emissions, the system is not likely to be reliant on the component in which a fault was detected. Even if it is not known precisely in which component the problem is located, it is still advantageous for the system to preclude switching to a high emission state, since the likelihood that the low emission state will have adverse effects from the problematic component is small. In many situations, the functionality monitor also causes the system to switch to a low emission state, when such a switch is required; however, in some redundant systems, such immediate action may not be necessary. The functionality monitor may further cause actions that are aimed at amending or identifying the problem further, such as self-tests, restarts, signaling the user, operator, or manufacturer, registering the event in the log(s), or communicating the situation to an external control unit, or may alter at least some of the operational parameters of the system.

The current system also differs from prior art systems in its method of responding to safety related events such as safety hazard detection, a probability of human-accessible emissions above a threshold, and to suspected malfunctions in the safety system.

The presently disclosed systems change to a low emission state, and then, in a novel implementation, they preclude the system from switching from a low emission state to a high emission state, until either the situation which caused the preclusion has changed and the system has performed a check to verify that it has indeed changed, or an external intervention to the system has occurred, such as a human initiated reset, or an interrupt from a remote server. An exemplary disclosed system, besides the above-mentioned detection of malfunctions and glitches, also precludes switching from the low to the high state under certain safety related events, or a possible but not certain malfunction, if at least one of the following conditions is met:

1. At least a portion of the sensors provide a signal indicative of a likelihood of human-accessible emission from the system above a predetermined threshold. The sensor or sensors provide data that is typical of a potentially hazardous human-accessible emission situation. Such a signal may be the combined result of data from multiple sensors. In such an event, the system also usually causes the system to immediately switch to a low emission state.
2. An inconsistency between results arising from at least two sensors is detected, even when none of the sensors are individually indicative of potentially hazardous human-accessible emission levels from the system. This is a situation which may be indicative of a problem with one of the sensors or with the component for which the sensor is responsible. In such a case, switching to the low emission state may be optional, or may be required, but preclusion of switching from the low to the high state is essential.

Human-accessible emission in the context of this disclosure is defined as electromagnetic emission from the product that can be intercepted by any part of the human body, or by any part of pets and objects found in places where humans live, such as cats, dogs, fish, farm animals, mice, lizards, mirrors, spoons, papers, glasses, and metallic objects, and reflectors.

Potentially hazardous human-accessible emission is a term used throughout this disclosure to describe human-accessible emission which may cause harm to a person or object, or exceeds a threshold larger than, for example, 10%, 25%, or 50% of a known safety threshold.

The term likelihood, as used throughout this disclosure is used to describe the positive potential of an occurrence. A likelihood level is assumed to be determined in the context of the system operation. Thus, for example, in a system where laser power levels in the high emission state, would pose a serious risk to humans and property, such as if a high power UV laser were being used, a substantially more fault sensitive system should be used. On the other hand, if a lower power infrared laser, is used, posing only a slight risk of a minor skin burn should inadvertent exposure occur, the system may be tuned to be less responsive to such a fault indication. Also, in systems that may work continuously, or in an environment where people are passing by, the level of likelihood considered to be "high" may be lower compared to systems that operate in sealed, non-accessible, areas such as the inside of an atomic reactor. One further reason to increase or decrease the level considered "a high likelihood", is the ability of persons in the vicinity to avoid the risk by seeing, or feeling it, and their ability to avoid such risk. Thus, the level of "high likelihood" would also differ for systems designed to be operated by trained personnel, such as lab workers or technicians, in an environment inaccessible for the general public, as compared to a system intended to be used by untrained personnel, such as the general public in a domestic setting, or even children).

The term indicative signals is used throughout this disclosure to describe signals that, under reasonable operational conditions, may be correlated to human-accessible emission.

The phrase inconsistency between measurements is used in the context of this disclosure to describe a condition when results arising from one measurement differ in an abnormal manner from results arising from another measurement, which may be correlated to a malfunction in the system. Such results may be either direct measurements, such as from sensors, or the results of calculations incorporating measurements.

The presently disclosed system follows a more robust and reliable method of responding to safety events and to indications of faults in the safety system compared to prior art systems, providing increased reliability. An exemplary presently disclosed system includes at least two independent, or nearly independent, methods for responding to a safety related event. Each of the methods may switch the system to a low emission state, if needed, and then precludes the system from switching to a high emission state. This preclusion can be achieved by keeping a switch in a state that does not allow high emission state operation, by executing a code that does not include an instruction to switch to a high emission state, by keeping a shutter closed or partially closed or by any other means known to a person skilled in the art. The system assures that the system is in a low emission state or is incapable of switching to the high emission state, meaning that it switches to the low emission state, and then prevents it from switching to the high emission state. Such prevention is preferably performed by using a first method, and thereafter, verifying, for example by using sensor(s), that the system has indeed ceased to be in a high emission state. Alternatively or additionally, the system may verify that it is incapable of switching to the high emission state. Should the first method fail to perform either of the above switching or precluding steps, or both, the second method is used to assure that the system is in a low emission state, and cannot switch to a high emission state. Alternatively, the second method may be used simultaneous, or at essentially the same time, to the first method as the first method, regardless of the outcome of the first method. In many situations both switches may not bring the system to the same low emission state, in which case there would be at least two different low emission states, such as low laser power, and off. Typically, there is one low emission state which is preferable, such as that which provides shorter recovery time as compared to the other low emission state, which typically is the one reached after using the first switch. The current system is thus more resilient to a malfunction of a switch, as compared to prior art systems.

An immediate switch to a low emission state, upon detection of a malfunction in a safety system that is redundant, is not needed and in some cases, even not advised. For example, a transmitter could be powering a receiver with a beam, protected by a redundant safety system comprising two cameras detecting objects in the beam's path, and one camera may be in a temporary fault condition due, for instance, to a passing car's mirror projecting sunlight into it and causing the sensor to be temporarily flooded with light. In this situation, there is no need to immediately turn the beam off, since it is protected by the second camera. However, in such a case, the system should not be allowed to switch from the low to the high state until the problem is eliminated. The presently disclosed systems are able to make such distinctions, and to respond appropriately and efficiently.

There is thus provided in accordance with an exemplary implementation of the devices described in this disclosure, a wireless power transmission system for transmitting a beam of optical power into a remote space, the system comprising:
(i) a transmitter comprising a beam generator unit, a beam deflection unit, and a transmitter control unit, the transmitter having at least one low emission state, and at least one high emission state, each of the high emission states having emissions higher than the highest emissions of the low emission states,
(ii) a receiver for receiving the optical power and incorporating a power conversion device,
(iii) a receiver control unit,
(iv) a receiver functionality monitor unit adapted, upon detection of a receiver control unit fault, to preclude the transmitter from switching from at least one low emission state to any of the at least one high emission states,
(v) a transmitter functionality monitor unit adapted, upon detection of a transmitter control unit fault, to preclude the transmitter from switching from at least one low emission state to any of the at least one high emission states, and
(vi) at least two sensors configured to provide signals indicative of a likelihood of human-accessible emission from the wireless power transmission system greater than a predetermined level,
wherein the transmitter control unit is adapted, upon receiving at least one of the signals indicative of a likelihood of human-accessible emission from the wireless power transmission system greater than the predetermined level, to preclude the transmitter from switching from at least one low emission state to any of the high emission states, and
wherein the transmitter control unit is adapted, when none of the at least two sensors are providing signals indicative of a likelihood of human-accessible emission from the wireless power transmission system greater than the predetermined level, and upon detecting an inconsistency between results arising from at least two of the sensors, to preclude the transmitter from switching from at least one low emission state to any of the at least one high emission states, and wherein the transmitter control unit is further configured to implement at least a first and a second method of precluding the transmitter from switching from at least one low emission state to any of the high emission states, either using both the first and second methods essentially at the same time, or using the first method, and subsequently using the second method.

In such a system, the second method may be used subsequent to the first method if the transmitter receives at least one of the signals indicative of a likelihood of human-accessible emission from the wireless power transmission system greater than a predetermined level. Furthermore, the second method may be used subsequent to the first method if at least one of (i) the transmitter functionality monitor unit detects a transmitter control unit fault, (ii) a receiver functionality monitor unit detects a receiver control unit fault, and (iii) the transmitter control unit detects an inconsistency between results arising from at least two of the sensors.

Any of such above-described systems may further comprise at least one emission-state sensor, and any of the configurations of the transmitter may be based on results from at least one of the emission-state sensors. In such a situation, using the first method and subsequently using the second method may further comprise, subsequent to using the first method, using at least one emission-state sensor to check if the transmitter is operating in a high emission state, and then if the transmitter is operating in a high emission state, subsequently using the second method.

According to yet further implementations of the above described systems, the results arising from at least two of the sensors may be measurements, or the results of calculations based on measurements.

Additionally, the above described inconsistency between results arising from at least two of the sensors may occur when the at least two sensors are functionally independent. Furthermore, the inconsistency being above a predetermined level may indicate a likelihood of a malfunction of one of the sensors, or even a likelihood of a malfunction of a device feeding at least one of the sensors.

In further implementations of the above described wireless power transmission systems,
there may be an expected normal range of measurements of at least one of the sensors, and the signals may be provided by at least one of the sensors when a measurement of at least one of the sensors has a departure of more than a predetermined level from the expected normal range. Furthermore, any of the above described predetermined levels may be defined by at least one known safety standard.

According to further implementations of the above described wireless power transmission systems, the methods of preclusion of the transmitter from switching from at least one low emission state to any of the at least one high emission states may include at least one of:
(i) keeping emissions at a sufficiently low level such that if the beam were to be human-accessible, the impinging emissions of the beam would be below at least one known safety standard,
(ii) maintaining the beam in a turned off state,
(iii) scanning the beam sufficiently rapidly that if the beam were to be human-accessible, the impinging emissions of the beam would be below at least one known safety standard,
(iv) directing the beam towards a beam block,
(v) actuating a diffuser into the path of the beam, and
(vi) splitting the beam into multiple beams.

In such a case, the at least one known safety standard may be a regulatory safety standard.

According to yet other implementations, the signals indicative of the likelihood of human-accessible emission from the wireless power transmission system greater than a predetermined level may be provided when a combination of the measurements obtained by the at least two sensors is indicative of a likelihood of human-accessible emission from the wireless power transmission system greater than a predetermined level, when none of the measurements of the at least two sensors are individually indicative of the likelihood of human-accessible emission from the wireless power transmission system greater than a predetermined level.

Alternatively, these signals indicative of a likelihood of human-accessible emission from the wireless power transmission system greater than a predetermined level may be provided when results of calculations using the measurements obtained by the at least two sensors are indicative of a likelihood of human-accessible emission from the wireless power transmission system greater than a predetermined level.

There is further provided, according to yet another implementation of the present disclosure, a wireless power transmission system for transmitting a beam of optical power to at least one receiver having a receiver control unit, a receiver functionality monitor unit and a power conversion device, the system comprising:
(i) a transmitter having at least one low emission state, and at least one high emission state, each of the high emission states having emissions higher than the highest emissions of the low emission states, the receiver functionality monitor unit being adapted to, upon detection of a receiver control unit fault, preclude the transmitter from switching from at least one of the low emission states to any of the high emission states, the transmitter further comprising a beam generator unit and a beam deflection unit,
(ii) a transmitter control unit,
(iii) a transmitter functionality monitor unit adapted, upon detection of a transmitter control unit fault, to preclude the transmitter from switching from at least one low emission state to any of the at least one high emission states, and
(iv) at least two sensors configured to provide signals indicative of a likelihood of human-accessible emission from the wireless power transmission system greater than a predetermined level,
wherein the transmitter control unit is adapted, upon receiving at least one of the signals indicative of the likelihood, to preclude the transmitter from switching from at least one low emission state to any of the high emission states, and
wherein the transmitter control unit is adapted, when none of the at least two sensors are providing signals indicative of the likelihood, and upon detecting an inconsistency between results arising from at least two of the sensors, to preclude the transmitter from switching from at least one low emission state to any of the at least one high emission states, and
wherein the transmitter control unit is further configured to implement at least a first and a second method of precluding the transmitter from switching from at least one low emission state to any of the high emission states, either:
(a) using both the first and second methods essentially at the same time, or
(b) using the first method, and subsequently using the second method.

Another implementation of the wireless power transmission systems for transmitting a beam of optical power to at least one receiver having a receiver control unit, a receiver functionality monitor unit and a power conversion device, may comprise:
(i) a transmitter having at least one low emission state, and at least one high emission state, each of the high emission states having emissions higher than the highest emissions of the low emission states, the receiver functionality monitor unit being adapted, upon detection of a receiver control unit fault, to preclude the transmitter from switching from at least one of the low emission states to any of the high emission states,
(ii) a transmitter control unit,
(iii) a transmitter functionality monitor unit adapted, upon detection of a transmitter control unit fault, to preclude the transmitter from switching from at least one low emission state to any of the at least one high emission states, and
(iv) at least two sensors configured to provide signals indicative of a likelihood of human-accessible emission from the wireless power transmission system greater than a predetermined level,
wherein the transmitter control unit is adapted, when none of the at least two sensors are providing signals indicative of the likelihood of human-accessible emission from the wireless power transmission system greater than a predetermined level, and upon detecting an inconsistency between results arising from at least two of the sensors, to preclude the transmitter from switching from at least one low emission state to any of the at least one high emission states.

Finally, there is also provided a method of transmitting a beam of optical power to at least one receiver having a receiver control unit, a receiver functionality monitor unit and a power conversion device, the method comprising:
(i) generating the beam of optical power in a transmitter having at least one low emission state, and at least one high emission state, each of the high emission states having emissions higher than the highest emissions of the low emission states, the receiver functionality monitor unit being adapted to, upon detection of a receiver control unit fault, preclude the transmitter from switching from at least one of the low emission states to any of the high emission states,
(ii) determining if a transmitter control unit fault has occurred by interrogating a transmitter functionality monitor unit, and if so, precluding the transmitter from switching from the at least one low emission state to any of the at least one high emission states, and
(iii) using at least two sensors to provide signals indicative of a likelihood of human-accessible emission from the wireless power transmission system greater than a predetermined level,
wherein, upon receiving at least one of the signals indicative of the likelihood of human-accessible emission from the wireless power transmission system greater than a predetermined level, precluding the transmitter from switching from at least one low emission state to any of the high emission states, and
wherein, if none of the at least two sensors are providing signals indicative of the likelihood, searching for any inconsistency between results arising from at least two of the sensors, and precluding the transmitter from switching from at least one low emission state to any of the at least one high emission states, and implementing at least a first and a second method of precluding the transmitter from switching from at least one low emission state to any of the high emission states, either:

(a) using both the first and second methods essentially at the same time, or (b) using the first method, and subsequently using the second method.

DETAILED DESCRIPTION

Figure 1:
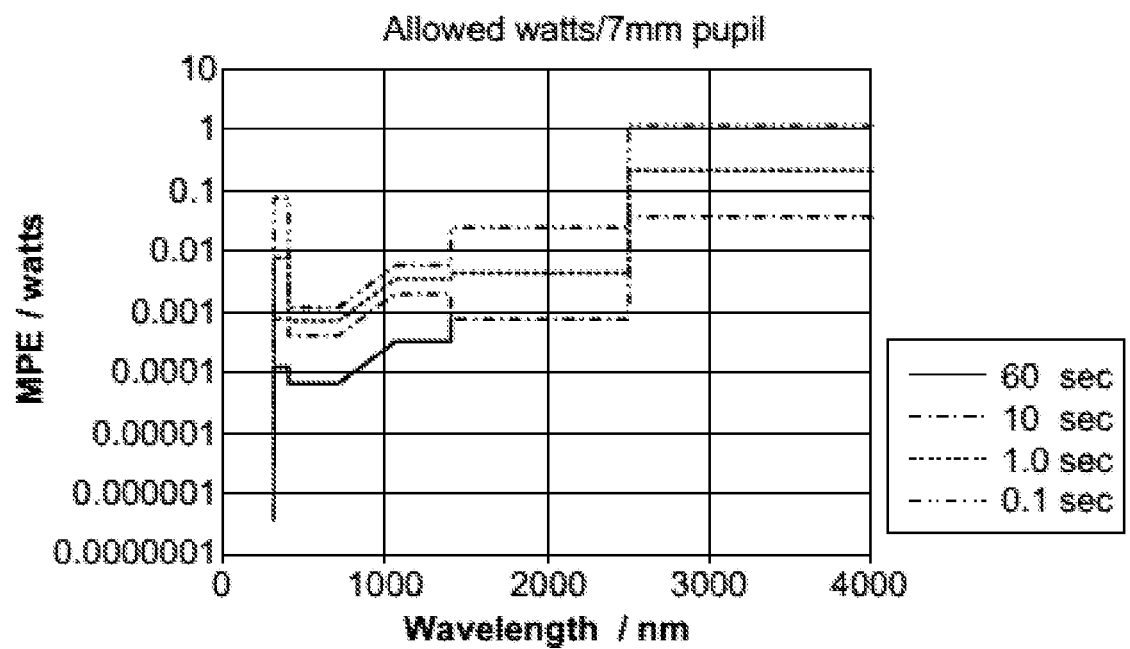
FIG. 1 shows a graph of Maximum Permissible Exposure Levels at various wavelengths and time durations.
Figure 2:
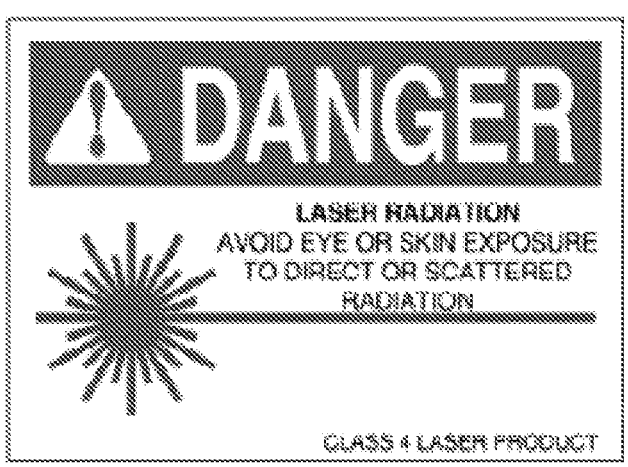
FIG. 2 shows showing an exemplary laser safety warning label.
Figure 3:
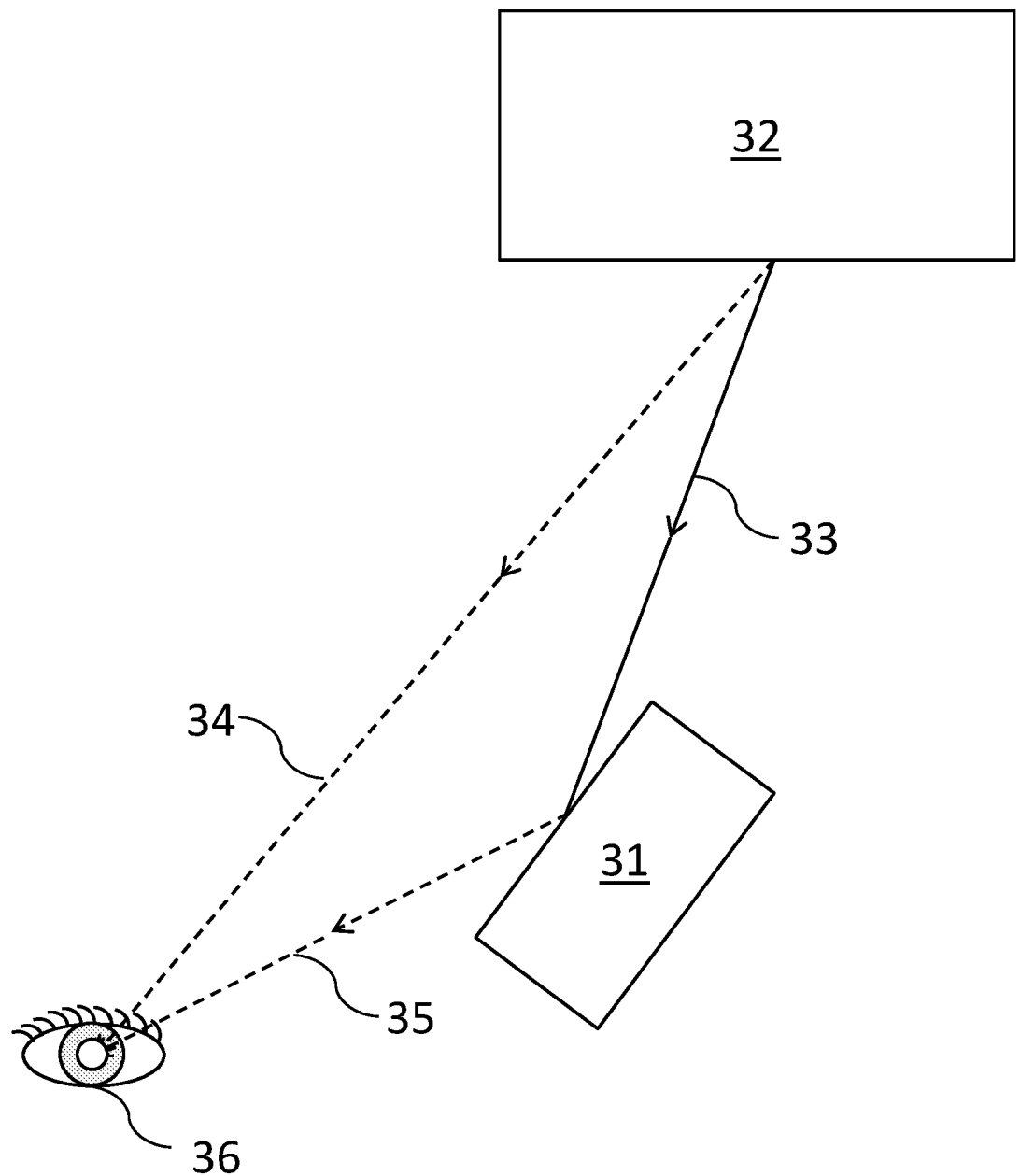
FIG. 3 shows a power transmitting system situation that is potentially hazardous due to a combination of factors, and that is detectable by an exemplary presently disclosed system.

The presently disclosed systems are able to detect and assess a combination potential hazard, arising from multiple sources. Reference is now made to FIG. 3, which shows a typical example of a situation that is potentially hazardous due to a combination of factors, and that is detectable by an exemplary system of the type described in this disclosure. The system of FIG. 3 shows a transmitter 32, projecting a power beam 33 towards a receiver 31, with the eye 36 of person shown in the vicinity of the receiver. The sources of potential hazard illustrated in this system could arise from a combination of two separate but safe situations:

a. a small, low power, harmless reflection 35, from the front surface of the receiver 31, and b. another small, low power, harmless ghost emission 34 from the transmitter 32

The presence, for instance, of dust on a sensor, could generate uncertainty in the measurement of the above two effects. Each of these factors may be safe on its own, but combined, there may be a point in space where emissions or reflections combine into dangerous levels, as shown in FIG. 3, where beams from both of the above mentioned effects are shown impinging on the eye 36. The presently disclosed system is configured to attempt to detect, and in most cases estimate the potential for such phenomena and respond appropriately to ensure safety.

The following remarks are pertinent in explaining the potential hazards of the system shown in FIG. 3, and the manner in which such risks are nullified by the present system. Since eye 36 is nowhere near power beam 33, it would not trigger any prior art safety system that only looks specifically for objects in the beam's path. In fact, in the scenario of FIG. 3, there is no foreign object whatsoever in the beam's path, for such a prior art safety system to detect.

Receiver 31 absorbs beam 33 almost entirely, as part of its normal operation.

Due to Fresnel reflection, a small portion of beam 33 is reflected from the front surface of receiver 31 in the form of reflection 35, which may be diffuse or specular.

Reflected beam 35 is below safety limits, and cannot cause any harm to Eye 36.

Transmitter 32 emits main beam 33 as well as a small, safe, low power, ghost beam 34, which may be emitted, for instance, as a result of Fresnel reflection from an optical component inside transmitter 32.

Ghost beam 34 may also be directed randomly towards eye 36.

Ghost beam 34 is also safe, below safety standard thresholds.

However, the combination of ghost beams 34 and reflection 35 may be dangerous, especially, for example, when noise is added to the situation.

The presently disclosed systems check to see if, in popular language, "something is wrong", not just if "something is in the beam path". The presently disclosed systems can handle vaguer and less defined potential hazards, usually characterized by the accumulation of borderline signals from various sensors. Besides the simple type of situation such as a combination of below-threshold signals such as that shown in FIG. 3, some such signals or the effects generating them, may include:

Confirmation signal was received, but the timing between the laser transmission and the reception of the confirmation signal is long, High/low temperature of components, Interference to the communication channels, Too low signal-to-noise ratio, Too high signal to noise ratio, Accumulation of errors, Loss of tracking signal or poor tracking signal, Spot sizes that differ from the expected values, Wavelength drifts, Timing drifts, Various frequencies appear in signals (such periodic fluctuations in laser power), Borderline power measurements, and Other indicative signals.

Such signals may not be indicative of any specific hazard, but a combination of two or more of such signals may indicate a potential hazard or malfunction and may cause safety subsystems to fail to perform properly. The current system uses such signals to provide an estimation of the potential for potentially hazardous human-accessible emission. Such estimation may be provided in many forms, such as a numerical value, a binary indication, or a change in thresholds. Such a signal does not need to be linear or monotonic with the potential of human-accessible exposure, but only needs to be indicative of it. An alternative implementation of this idea is to determine different "regimes" where safety margins are changing as a function of the various components or to compensate measurements based on parameters such as temperatures.

Such complex estimations, for example combined potential hazards, or assessment of potentially hazardous human-accessible emissions, typically require the use of CPUs, controllers, embedded computer systems, ASICs, and other complex electronic circuits, all of which are prone to fault, and therefore, should not be relied on alone for determining whether the system is operating safely, but may be used alone or in combination to preclude the system, from switching to a high-emission mode.

Figure 4:
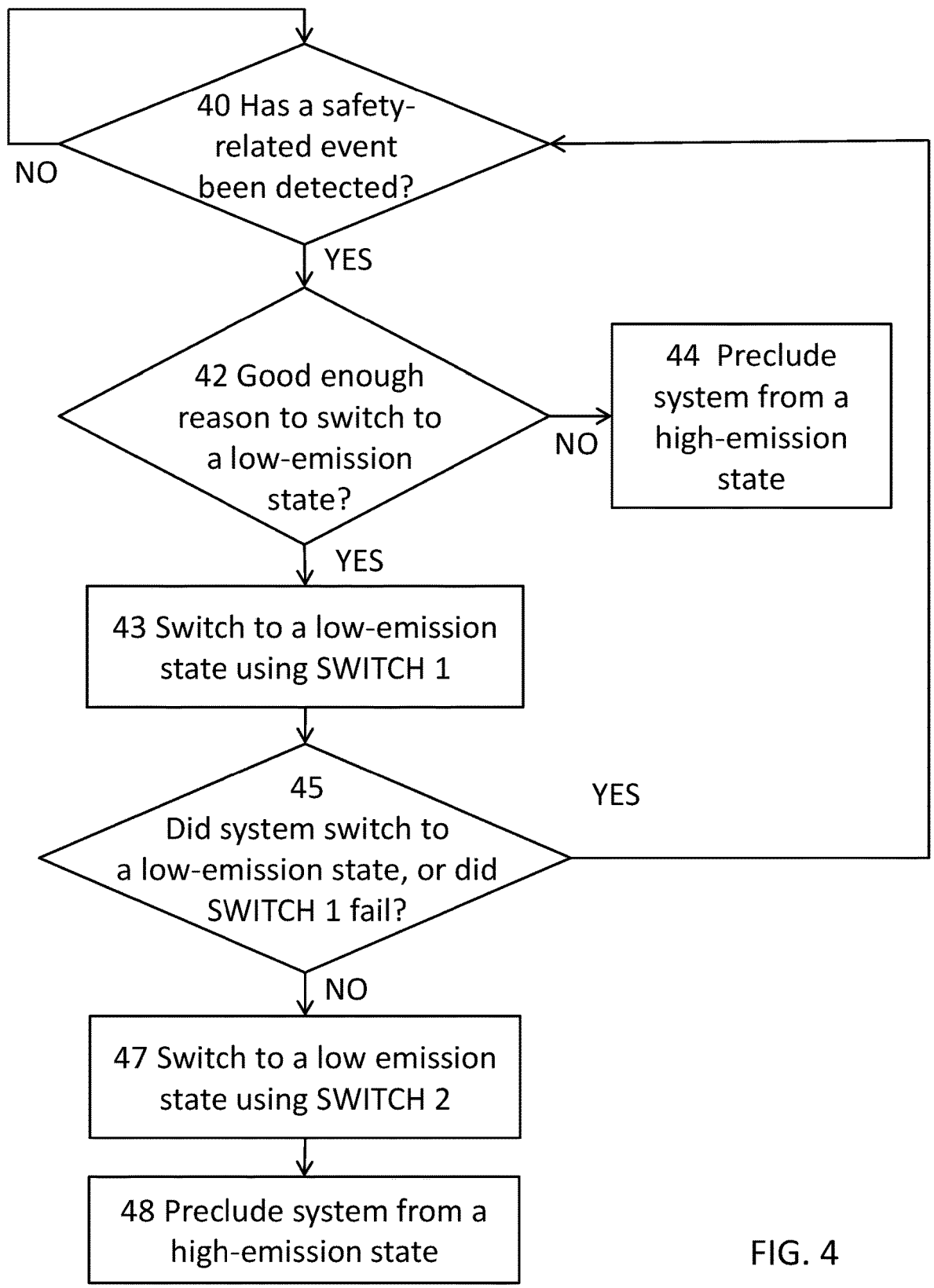
FIG. 4 shows an exemplary method of the present disclosure for responding to a safety related event.

Reference is now made to FIG. 4, showing an exemplary method for responding to a safety related event. The method used by the current system is to preclude the system from switching to a high emission state, and if needed, to cause the system to switch to a low emission state. Such a method is more reliable than prior art systems, which generally switch the beam to a low power or even OFF in the situation of any safety related event being sensed. While this may be a good practice in some cases, it does unnecessarily limit the availability of the system in situations where this may be voided. Since the presently disclosed system has redundant safety systems, there is not always a pressing need to immediately switch the system to low emission or off, since the present system is able to differentiate between situations which can be solved without the drastic measure of reducing the emission of the system. In step 40, the system checks for a safety related event, either continuously or periodically. If a safety related event is not discovered, the system continues checking, using data from one or more sensors. In step 41, a safety related event is discovered. Such an event may be, for example, detection of a receiver control unit malfunction by a receiver functionality monitor unit, detection of a transmitter control unit malfunction by a transmitter functionality monitor unit, a signal provided by one or more sensors that is indicative of a likelihood of human-accessible emission from the wireless power transmission system greater than a predetermined level, or detection of an inconsistency between results arising from at least two sensors. In step 42, the system determines if there is a good cause for switching to a low emission state. This may be determined, for example, by accessing a historical database and comparing the data sets of the current situation, by performing a statistical analysis on the data, or by predicting the probability that the current data points relating to the detected fault will result in a hazardous situation. If there is not a good cause for taking the stronger step of switching to a low emission state, the system precludes the system from reaching a high emission state in step 44, which provides sufficient protection while allowing the system to continue operating normally. If it is determined that there is a good cause for switching to a low emission state, in step 43, the system switches to a low emission state using a first switch or method. In step 44, the system precludes the system from switching to a high emission state. In step 45, the system tests the success of the first switch, such as by determining if the first switch failed or by determining if the system is in a low emission state. If there is success in step 45, then there is no need to use the second switch or second method, and the system continues to search for safety related events in step 40, either immediately or periodically after a predetermined time interval. If the first switch was determined not to have been successful, in step 47, the system switches to a low emission state using a second switch or method. The second method may be used if at least one of the following steps occurs:
  (i) the transmitter receives signals indicative of a likelihood of human-accessible emission from the wireless power transmission system, greater than a predetermined level,
  (ii) the transmitter control unit detects an inconsistency between results arising from at least two of the sensors,
  (iii) the transmitter functionality monitor unit detects a transmitter control unit malfunction, and
  (iv) the receiver functionality monitor unit detects a receiver control unit malfunction.

In step 48, the method precludes the system from switching to a high emission state. This method is thus resilient to a failure of the first switch or method by using a second, different switch, and also provides additional reliability by checking to determine if the first switch was successful.

Figure 5:
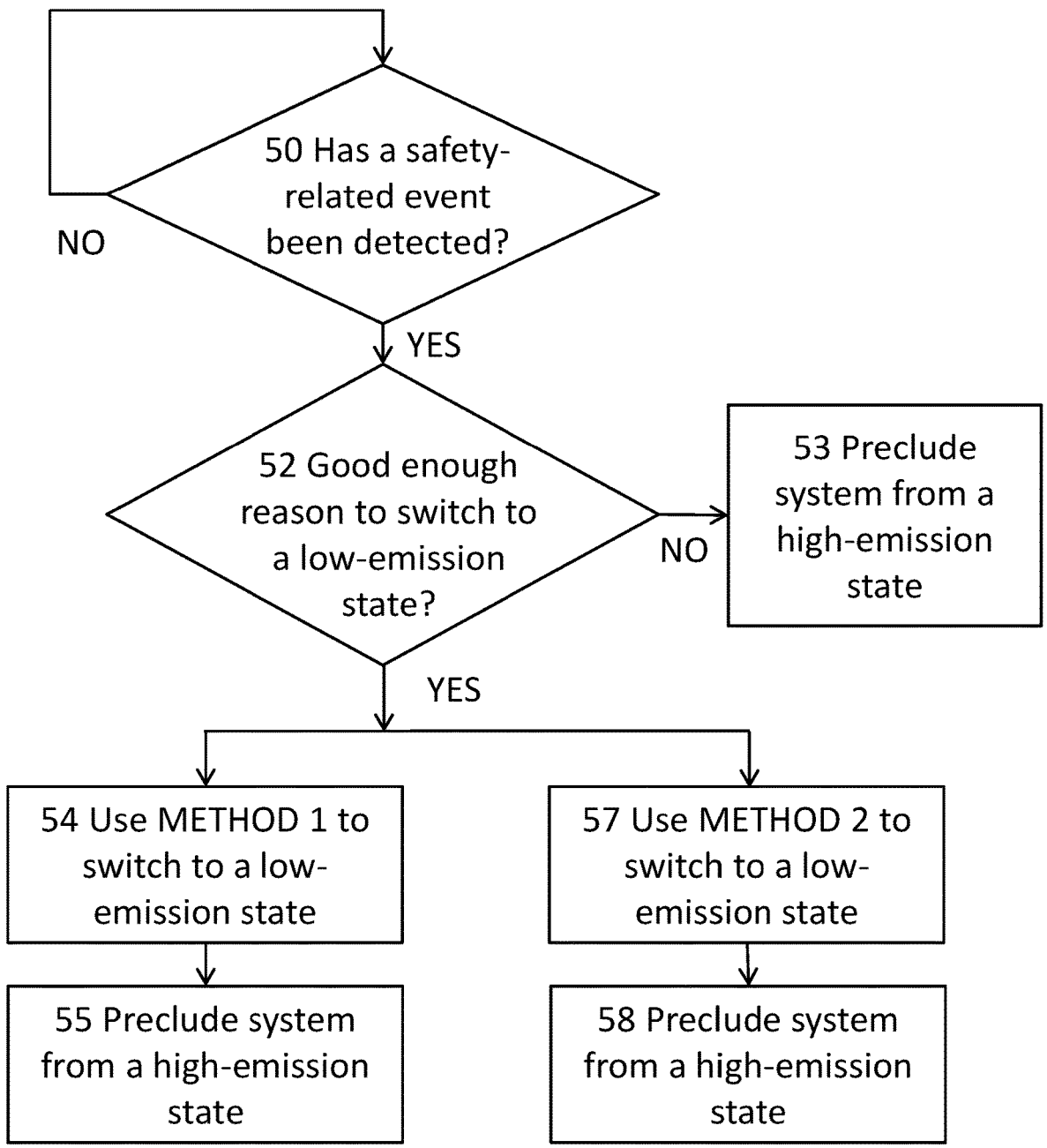
FIG. 5 shows an alternative method of the present disclosure for responding to a safety related event.

Reference is now made to FIG. 5, which shows an alternative method of responding to a safety related event. In step 50, the system checks for a safety related event, either continuously or periodically. If a safety related event is not discovered, the system continues checking, using data from one or more sensors. In step 52, if a safety related event has been discovered, it is determined if there is good cause for switching to a low emission state. This may be determined, for example, by accessing a historical database and comparing the data sets of the current situation, by performing a statistical analysis on the data, or by predicting the probability that the current data points relating to the detected fault will result in a dangerous situation. If there is not a good cause for switching to a low emission state, the system precludes switching to a high emission state in step 53. If there is good cause, two different, and usually functionally independent, methods are used simultaneously. In step 54, method 1 causes the system to switch to a low emission state. In step 55, method 1 further precludes the system from switching to a high emission state. In step 57, which takes place at essentially the same time as step 54, method 2 causes the system to switch to a low emission state. In step 58, method 2 precludes the system from switching to a high emission state. This method is thus resilient both to failure of method 1 and to failure of method 2, since they are both used simultaneously, such that the probability that both methods would fail simultaneously is usually so extremely small that it can be ignored.

Figure 6:
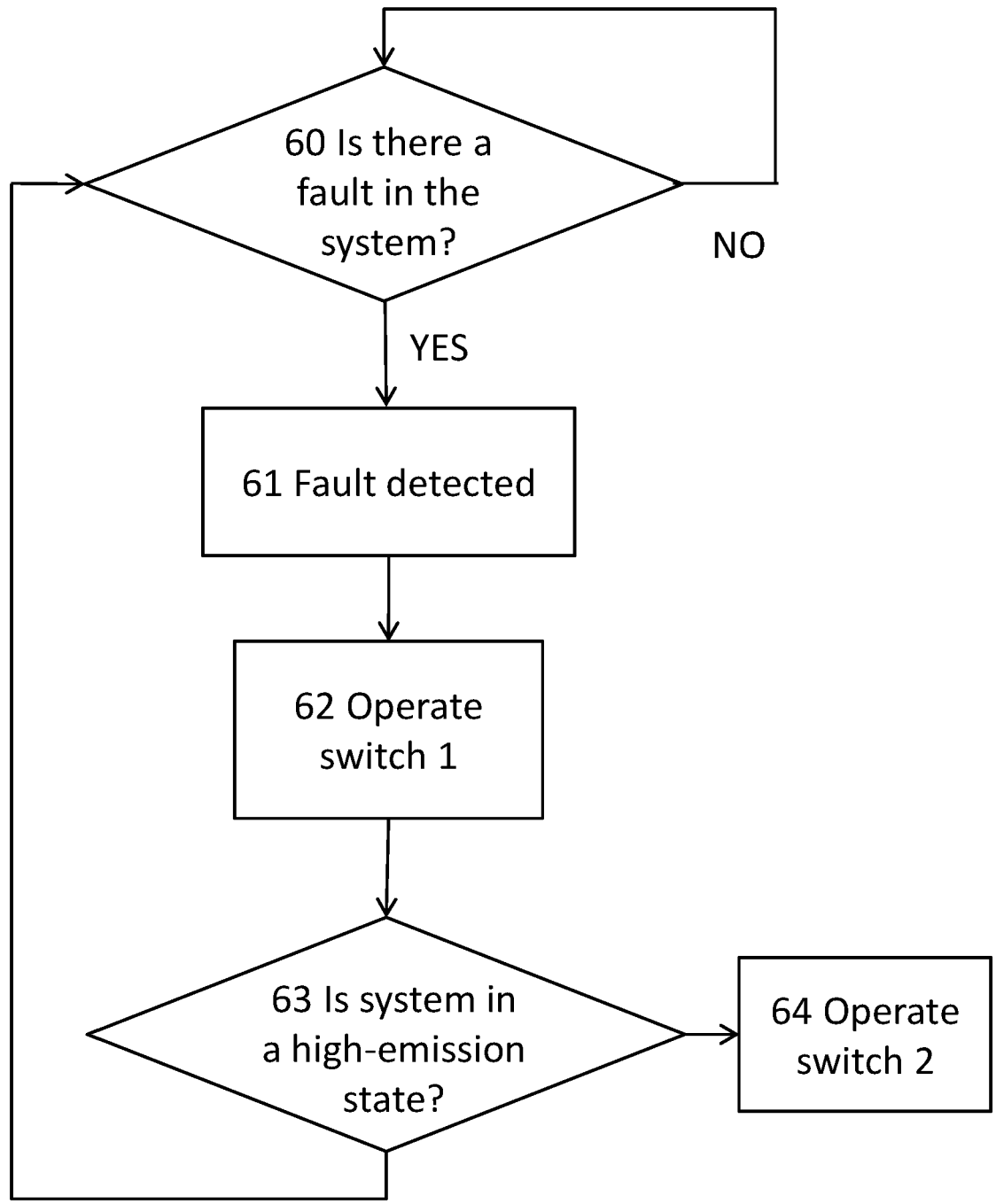
FIG. 6 shows an exemplary method of the present disclosure for maintaining safety upon detection of a glitch, fault, or malfunction in a complex component.

Reference is now made to FIG. 6, which shows an alternative method for maintaining safety upon detection of a glitch, fault, or malfunction in a complex component. In step 60, the system checks for faults using data from one or more sensors. In step 61, a fault is detected. In step 62, the functionality monitor operates switch #1 to preclude the system from operating in any high emission state. In step 63, the functionality monitor verifies that the system has ceased operating in the high emission state and, if it has not ceased, operates switch #2 in step 64, to preclude the system from operating in a high emission state. If in fact the high emission state has ceased, then the system continues to check for detection of faults in step 60. Both the confirmation step 63, and the use of a different, independent switch 2, make the system more reliable and reduce the risk of human-accessible emissions exceeding a predetermined threshold.

The following is an exemplary method for detecting a faulty sensor by comparing measurements from two different sensors.

Example 1

Sensor 1 is a generalized sensor, e.g. it "senses" the power lost between the transmitter and the receiver by calculating the following function.

$$\text{Sense Value} = [I_{LDD}*\gamma] - [I_{pv}*\beta]$$

where
  $I_{LDD}$ is the current fed into the laser
  $I_{pv}$ is the current collected from the PV γ and β are correction factors (relating inter alia, to efficiencies)

Sensor 2 is a generalized sensor, e.g. it also "senses" the power lost between the transmitter and the receiver by calculating the following function.

$$\text{Sense Value}=[P_{TX}]-[P_{rx}/\mu]$$

where
- $P_{TX}$ is the power emitted from the transmitter (typically calculated by measuring a small portion of the power passing inside the transmitter, typically the portion measured is not emitted from the transmitter).
- $P_{rx}$ is the power collected from the PV
- $\mu$ is a correction factor (generally the receiver efficiency)

In theory, sensor 1 and sensor 2 should always give the same result differing only by noise.

In reality, should sensor 1 give a result significantly different from sensor 2, for a time period that is long enough to determine that the difference should not be attributed to noise, there is a reason to suspect that either sensor 1 or sensor 2 are faulty. In such a situation, the current system would switch to a low emission state although there is no indication of potentially hazardous accessible emissions from either sensor.

The following is an exemplary fail-safe method of switching to a low emission state using two different switches, Switch 1 and Switch 2.

Example 2

1. Use Switch 1 to bring the system to a known low emission state and/or to preclude it from switching to a high emission state, as needed.
2. Verify, using a sensor that the system has indeed switched to a low emission state and that the system is precluded from switching from the low emission state to a high emission state.
3. If the system has not switched to a low emission state, use switch 2 to do so. Switching to a low emission state in this context is a positive indication of the success of switch 1, but other methods may also be used to determine the success or failure of switch 1 before using switch 2. This method provides a fail-safe mechanism of bringing the system to a low emission state and/or of precluding it from switching from the low emission state to a high emission state. In an alternative implementation, the controller uses both Switch 1 and Switch 2 concurrently. However, usually one of the switches comes at a higher "cost", such as in recovery time, noise, poor service to the client, loss of tracking or even in physical damage to the system, while the other may be "low cost". For example, turning off a laser using the laser driver is preferred to terminating the power to the complete laser system, as turning off the power also terminates the cooling system and might result in hardware damage. Therefore, it may be more efficient in some systems to use the method of Example 2.

Figure 7:
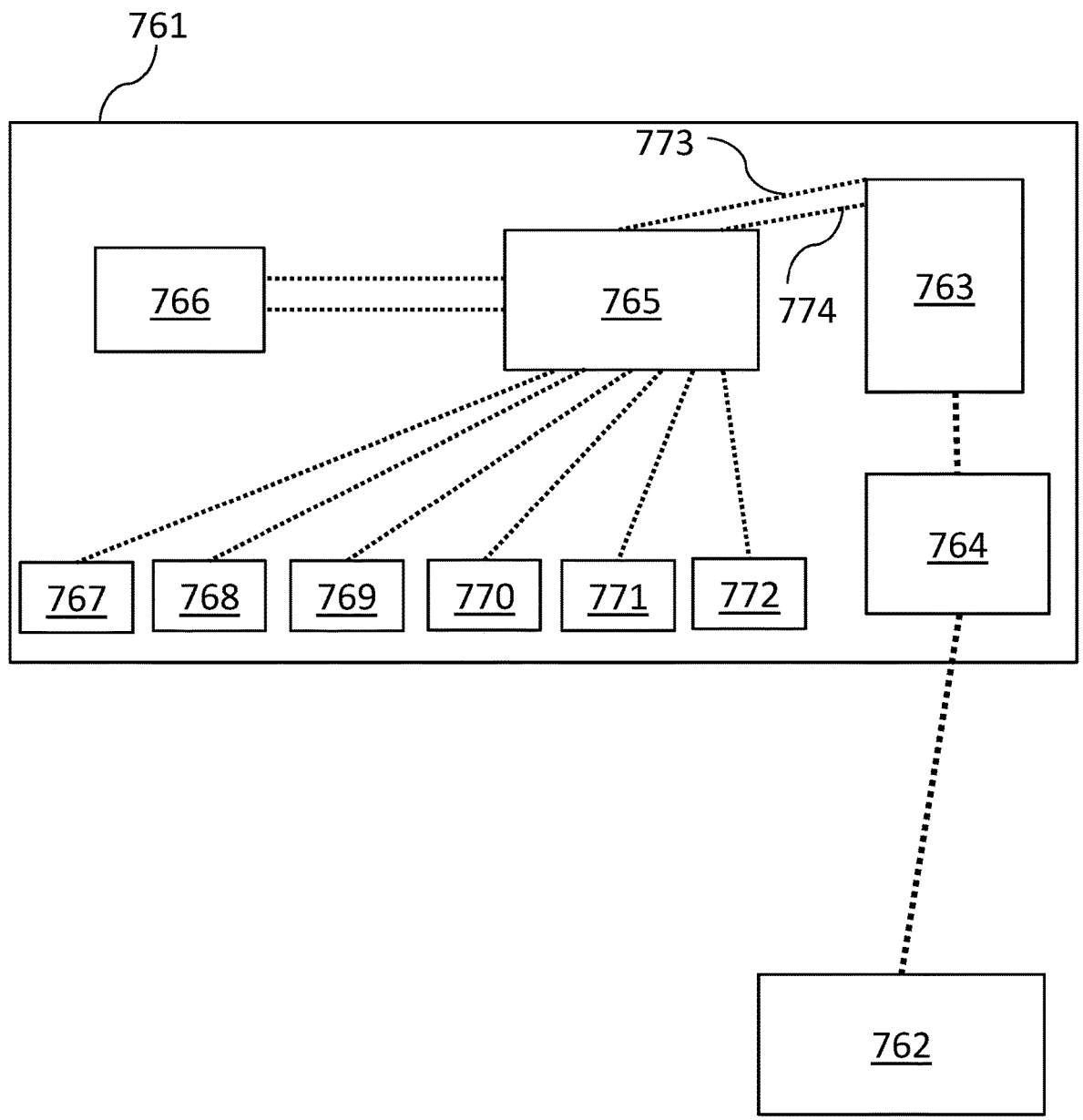
FIG. 7 shows a schematic representation of one example of a complete power transmitting system as described in this disclosure.

Reference is now made to FIG. 7 which shows a schematic representation of one example of a complete power transmitting system as described in this disclosure.

Transmitter 761 is shown powering a remote receiver 762, which incorporates a power conversion device (not shown in FIG. 7) and a receiver functionality monitor which should detect receiver controller faults (also not shown in FIG. 7, since some of its functional circuits may be located remotely in the transmitter). The transmitter comprises a beam generator 763 and a beam deflection unit 764. In addition, the transmitter also comprises various sensor and control unit elements, including at least two hazard sensors, such as 767 to 771, at least one fault detector 772 and a functionality monitor 766, all or part of the latter items being part of or associated with the transmitter control unit 765.

The control unit 765 has two methods to preclude beam generator 763 from switching from a low emission state to a high emission state (773 and 774). Such methods can also be triggered by functionality monitor 766. Upon detection of a hazard by at least one hazard sensor 767-771, the control unit 765 precludes beam generator 763 from switching to the high emission state. Upon detection of a possible fault, either by fault detector 772 or by an inconsistency between the signals of hazard sensors 767-771 or by a characteristic fault pattern such as abnormal signal to noise ratio, the control unit 765 precludes beam generator 763 from switching to the high emission state.

Figure 8:
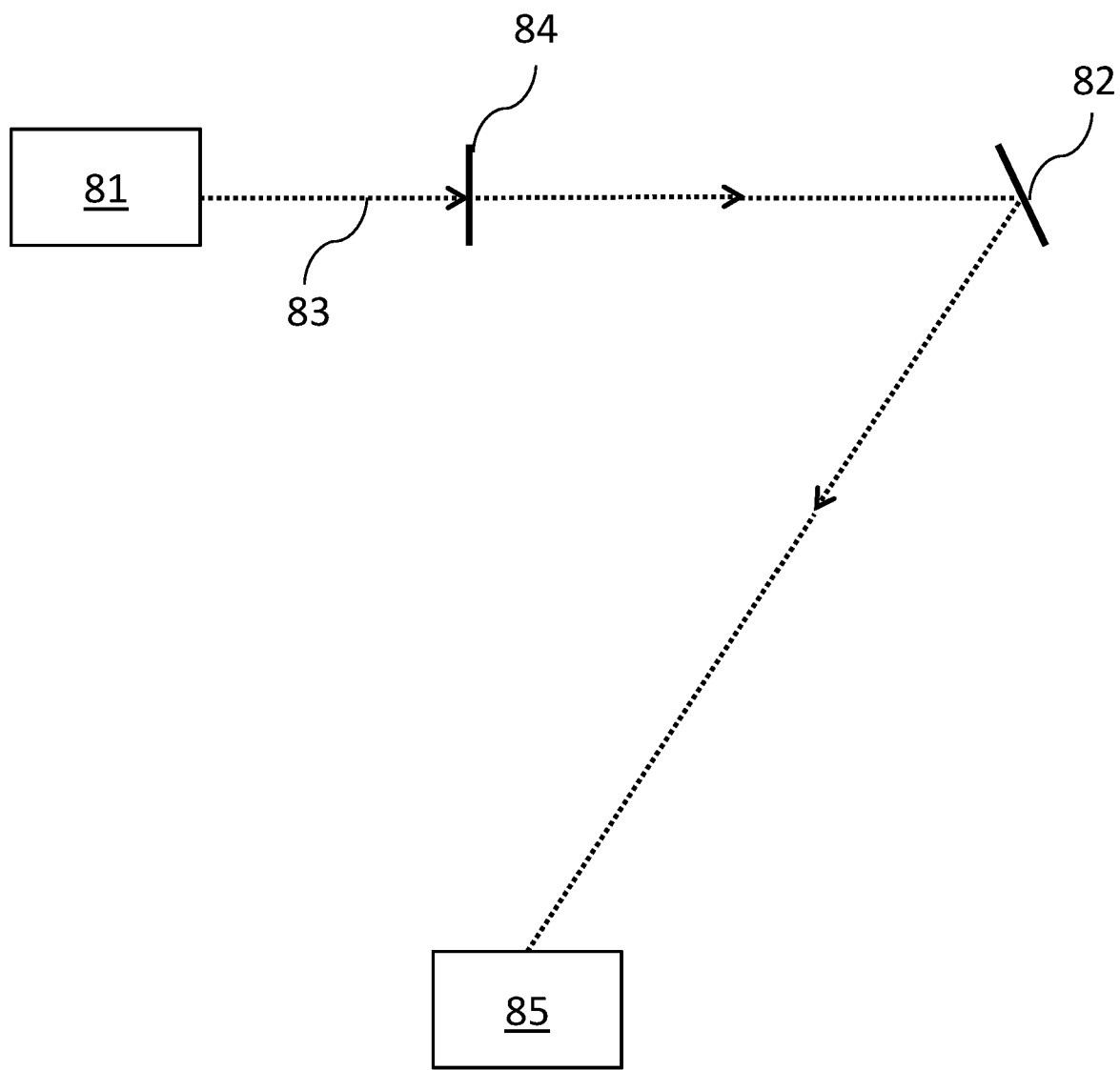
FIG. 8 shows an exemplary power transmitting system of the present disclosure, adapted to achieve a low emission state that requires minimal complex electronics.

Reference is now made to FIG. 8, which shows exemplary methods to achieve a low emission state that require minimal complex electronics. Such methods are thus safer to use in the event of a fault detection, since they are unlikely to be reliant on faulty component(s). Laser 81 may be turned off, or operated in a low power mode, or may be operated in a known eyesafe wavelength, or may be operated in a manner causing the emitted beam to be a divergent or diffused beam 83. An alternative implementation uses beam attenuator 84, which may be a shutter 84 blocking the beam 83, or may be a diffuser (not shown in FIG. 8) diffusing beam, or may be an attenuator (not shown in FIG. 8) attenuating the beam. Yet another implementation uses beam deflection unit 82, which may cause the beam to scan the surrounding environment quickly, or may direct the beam towards a beam-block 85, which may block, absorb, attenuate, or diffuse the beam. Any of these methods may be used individually or concurrently, in accordance with the data parameters of the current situation. The system may have algorithms to determine which of the method(s) as described above are optimal to incorporate, and within what time periods. Any of these methods may be used in accordance with the methods of FIGS. 4, 5 and 6, either as methods of causing the system to switch to a low emission state or as methods of precluding the system from switching to a high emission state.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A wireless power transmission system for transmitting a beam of optical power into a remote space, said system comprising:
   a transmitter comprising:
   a beam generator unit adapted to generate a beam having at least one first beam emission state, and at least one second beam emission state, each of said at least one second beam emission state having a beam emission level higher than the highest beam emission levels of any of said at least one first beam emission state,
   a beam deflection unit, and
   a transmitter control unit having a functionality monitor unit, said transmitter control unit configured: (i) to ensure the safety of said wireless power transmission system when said wireless power transmission system is operating in said at least one second beam emission state and (ii) to use at least two methods for responding to safety related events;
a receiver for receiving said optical power, the receiver incorporating a power conversion device;
a receiver control unit having a receiver functionality monitor unit;
at least two sensors configured to provide signals to said transmitter control unit, said signals indicative of a human-accessible beam emission level of the beam from said transmitter; and
at least one emission-state sensor, configured to provide an indication of whether said wireless power transmission system is in a first or a second beam emission state;
wherein, if said wireless power transmission system is operating in said at least one second beam emission state, each of said at least two methods is adapted to perform the steps of:
(a) switching the wireless power transmission system to said at least one first beam emission state; and
(b) precluding said wireless power transmission from switching to said at least one second beam emission state.

2. The wireless power transmission system according to claim 1, wherein said system is further configured to use said at least two methods when none of said at least two sensors provide a signal indicative of a likelihood of human accessible beam emission, in the event of detecting any of the following events:
(i) a signal from said transmitter control unit's functionality monitor unit indicative of a functionality fault;
(ii) a signal from said receiver functionality monitor unit indicative of a receiver functionality fault; and
(iii) an inconsistency between said at least two sensors, said inconsistency being indicative of a fault.

3. The wireless power transmission system according to claim 1, wherein said precluding is done by either:
(i) keeping a switch in a state that does not allow said at least one second beam emission state,
(ii) executing a code that does not include an instruction to switch to said at least one second beam emission state, or,
(iii) keeping a beam shutter closed or partially closed.

4. The wireless power transmission system according to claim 1, wherein should a first one of said at least two methods fail to perform either said switching or said precluding, a second one of said at least two methods is used.

5. The wireless power transmission system according to claim 1, wherein said at least two methods are used essentially at the same time.

6. The wireless power transmission system according to claim 1, wherein said at least two methods are used sequentially.

7. The wireless power transmission system according to claim 1, wherein said at least two methods each brings said wireless power transmission system to a different first beam emission state.

8. The wireless power transmission system according to claim 7, wherein one of said different first emission states is a zero beam emission state.

9. The wireless power transmission system according to claim 1, wherein, if said wireless power transmission system is operating in said at least one second beam emission state, each of said at least two methods is further adapted to also perform the step of:
(c) verifying, using said at least one emission state sensor, that said wireless power transmission system has ceased to be in said at least one second beam emission state.

* * * * *